United States Patent [19]
Becker

[11] 3,836,790
[45] Sept. 17, 1974

[54] A-C VOLTAGE DETECTOR
[75] Inventor: Dustin J. Becker, Sheffield Lake, Ohio
[73] Assignee: Lorain Products Corporation, Lorain, Ohio
[22] Filed: Aug. 22, 1973
[21] Appl. No.: 390,349

[52] U.S. Cl............ 307/235 R, 307/295, 317/27 R, 317/31, 317/DIG. 5, 340/248 A
[51] Int. Cl.......................... H03k 5/20, H02h 3/28
[58] Field of Search .... 307/235, 295; 317/31, 27 R, 317/DIG. 5; 340/248 R, 248 A, 248 C

[56] References Cited
UNITED STATES PATENTS

| | | | |
|---|---|---|---|
| 3,001,100 | 9/1961 | Schuti et al. | 307/235 |
| 3,157,826 | 11/1964 | Norton | 317/31 |
| 3,225,257 | 12/1965 | Fegley | 340/248 C |
| 3,243,658 | 3/1966 | Blackburn | 317/31 |
| 3,407,338 | 10/1968 | Secunde | 307/235 |
| 3,457,560 | 7/1969 | McKinley | 307/235 |
| 3,489,920 | 1/1970 | Moore et al. | 317/31 |
| 3,535,591 | 10/1970 | Holmquest | 317/31 |
| 3,611,162 | 10/1971 | Tochitani | 307/235 |
| 3,749,944 | 7/1973 | Luebrecht | 307/235 |
| 3,792,313 | 2/1974 | Conrad | 317/27 R |

Primary Examiner—Stanley D. Miller, Jr.
Attorney, Agent, or Firm—Edward C. Jason

[57] ABSTRACT

A circuit for detecting whether the peak magnitude of one or more phases of a polyphase voltage has varied outside of acceptable high and low voltage limits. A high voltage detecting network produces a first voltage when the peak amplitude of the input voltage remains below an acceptable maximum and produces a second voltage when the peak amplitude of the input voltage exceeds that acceptable maximum. A low voltage detecting network produces a first voltage when the peak amplitude of the input voltage exceeds an acceptable minimum and produces a second voltage when the peak amplitude of the input voltage fails to exceed that acceptable minimum. A timing network indicates a fault condition if either detector produces its second voltage on a recurrent basis for more than a predetermined time. Together these networks assure that fault indications do not occur in the presence of occasional excessive input voltage excursions or in the presence of normally occurring a-c voltage transients and thus prevent false indications of input voltage faults.

17 Claims, 14 Drawing Figures

FIG. 1

A-C VOLTAGE DETECTOR

BACKGROUND OF THE INVENTION

The present invention relates to a-c voltage failure detection circuits and is directed more particularly to polyphase a-c voltage failure detection circuits wherein the passage of one or more phases of the polyphase voltage from within preset maximum and minimum limits for more than a predetermined time initiates a voltage failure indication which may be used to control associated corrective or alarm circuitry.

Under circumstances where the ability of an a-c source to energize an a-c load is dependent upon the ability of the a-c source to supply a-c voltages having peak magnitudes that fall within preset maximum and minimum voltage limits, it is desirable to provide circuitry which can indicate whether the voltage being monitored is within or without those limits and which can utilize that indication to initiate any appropriate corrective or alarm activity. If, for example, an a-c load requires a three-phase input voltage in which each phase must have a peak value which falls within voltage limits corresponding to RMS voltages of 100 and 125 volts, a voltage in excess of the upper voltage limit may result in the overheating of the load and a voltage less than the lower voltage limit may result in load failure. In such systems, an a-c voltage fault indication is desirable to initiate an orderly shutdown of the load or to reconnect the load to a substitute source which has a satisfactory voltage amplitude.

One serious problem in determining the suitability of the voltages provided by a polyphase a-c source is that one or more of the phases thereof may deviate outside of acceptable voltage limits on a merely transient basis following sudden changes in the magnitude of the a-c load current. Such transient changes in the magnitude of the polyphase voltage are an inherent characteristic of any a-c source having internal inductance and capacitance and do not indicate that the polyphase voltage has varied outside of acceptable limits. Accordingly, an a-c voltage failure detection circuit must be able to distinguish between actual input voltage faults and apparent input voltage faults such as transient voltage fluctuations.

Another problem in detecting polyphase voltage faults is that such faults may occur in only one phase or in any combination of phases. In addition, a polyphase voltage may fail by establishing an excessive voltage in one phase and at the same time establishing an insufficient voltage in one or more of the other phases. Effective voltage failure detection circuitry must be able to produce the desired fault indication in the presence of any of these fault conditions.

In accordance with the present invention there is provided failure detection circuitry which establishes both high and low voltage limits between which the voltage of each phase of a polyphase voltage must fall if the overall polyphase voltage is to be indicated as having an acceptable value. In addition, the circuit of the invention is arranged so that ordinary transient changes in the amplitude of one or more phases of the polyphase voltage do not produce an a-c voltage fault indication unless those transient voltage changes continue for a time sufficiently long that an extraordinary or fault condition is known to exist.

SUMMARY OF THE INVENTION

It is an object of the invention to provide an improved a-c voltage failure detection circuit.

Another object of the invention is to provide an a-c voltage failure detection circuit that detects a-c voltage faults both in the form of excessively high a-c voltage excursions and in the form of insufficiently high a-c voltage excursions.

Yet another object of the invention is to provide an a-c voltage failure detection circuit of the above character which is adapted to monitor a polyphase voltage and to indicate a fault condition when the magnitude of any one or more of the phases of the polyphase voltage varies outside of acceptable limits.

Still another object of the invention is to provide an a-c voltage failure detection circuit which allows ordinarily occurring transient voltage fluctuations to occur without producing an a-c voltage failure indication.

It is another object of the invention to provide an a-c voltage failure detection circuit which has a tendency to indicate the existence of an unacceptably low input voltage condition but which is prevented from indicating that condition so long as each phase of the polyphase voltage has an acceptably high value.

DESCRIPTION OF THE INVENTION

Figure 1:
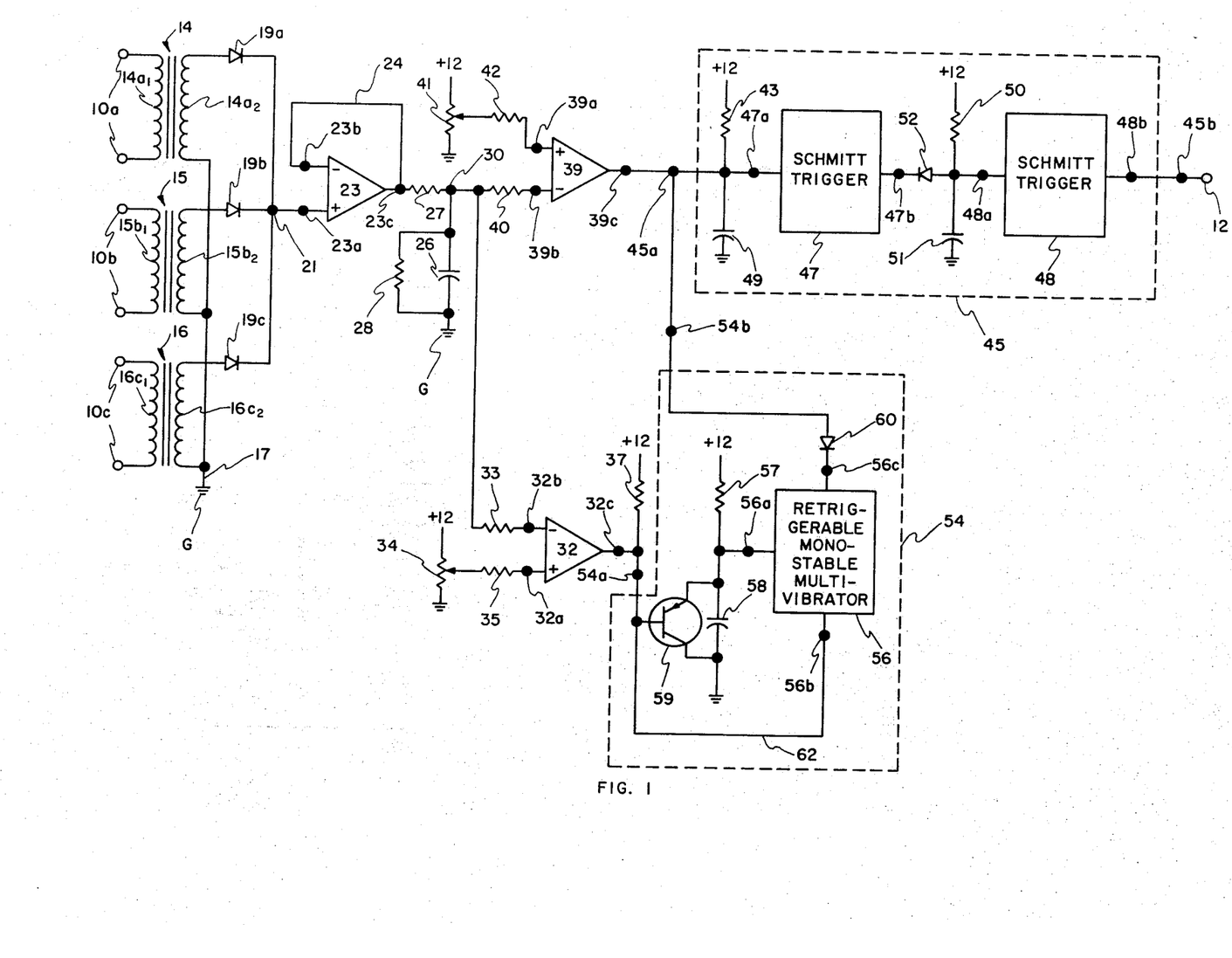
FIG. 1 is a schematic diagram of an exemplary circuit embodying the invention.

Referring to FIG. 1 there is shown an a-c voltage failure detection circuit having input terminal pairs 10a, 10b and 10c and having an output terminal 12. Input terminal pairs 10a, 10b and 10c may be connected to respective phases of any suitable three phase voltage source such as, for example, the output terminals of a three phase inverter. Output terminal 12 may be connected to any suitable control or alarm circuitry the operative condition of which is to be controlled in accordance with whether or not each of the polyphase input voltages is or is not within acceptable voltage limits.

In the present embodiment, the circuit of the invention includes input coupling transformers 14, 15 and 16 having respective primary windings $14a_1$, $15b_1$, and $16c_1$ and having respective secondary windings $14a_2$, $15b_2$ and $16c_2$. It will be understood that the turns ratio of these transformers should be such that the secondary voltages thereof are consistent with the voltage levels present within the voltage detecting circuitry when the primary voltages thereof are within acceptable voltage limits.

Figure 2A:
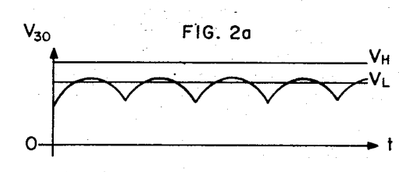
FIGS. 2a, 2b and 2c show selected ones of the voltages appearing in the circuit of FIG. 1 when the magnitude of the a-c input voltage is within acceptable limits.

As shown in FIG. 1, the lower ends of secondary windings $14a_2$, $15b_2$ and $16c_2$ are connected together and to ground G through a conductor 17. The upper endings of secondary windings $14a_2$, $15b_2$ and $16c_2$ are connected to a junction 21 through respective diodes 19a, 19b and 19c which serve to rectify the voltages across respective secondary windings and thereby provide a three-phase half-wave rectified voltage between ground G and junction 21. The waveform of this voltage is shown in FIG. 2a. Thus, the voltage between ground G and junction 21 consists of a pulsating d-c voltage including pulses which are generated in succession by the voltages at input terminal pairs 10a, 10b and 10c.

To the end that the rectified polyphase voltage at junction 21 may control the associated voltage failure detection circuitry without drawing substantial current through transformers 14, 15 and 16, there is provided a voltage follower network which here takes the form of an operational amplifier 23 having a positive or non-inverting input 23a, a negative or inverting input 23b and an output 23c. Amplifier output 23c is connected to amplifier input 23b, through a conductor 24, to assure that the voltage at amplifier output 23c is substantially equal to the voltage at amplifier input 23a. Because of the high input impedance of amplifier 23, however, the latter draws only negligible current through transformer windings $14a_2$, $15b_2$ and $16c_2$. Thus, amplifier 23 forces the voltage at junction 23c to follow that at junction 21 and at the same time presents a high impedance to the a-c input voltage.

In the event that input terminal pairs 10a, 10b and 10c are connected to the output of a polyphase inverter, switching transients in the inverter output voltage will feed through the previously described input coupling circuitry and appear in the voltage at amplifier output 23c. In order to prevent these switching transients from adversely affecting the voltage failure detecting circuitry, a capacitor 26 is connected between amplifier output 23c and ground through a resistor 27. Capacitor 26 should be sufficiently large to remove such switching transients and yet not large enough to alter the pulsating character of the voltage at junction 30. Resistor 27 cooperates with capacitor 26 to prevent the capacitive phase shift introduced by capacitor 26 from feeding back into amplifier 23 and thereby causing undesired oscillations. A resistor 28 which is connected across capacitor 26 prevents that capacitor from charging to the peak voltage at amplifier output 23c and remaining there.

To the end that the rectified polyphase voltage at junction 30 may be compared to a preset low voltage limit to determine whether the magnitude thereof is or is not in excess of that limit, there is provided low voltage comparing means which here takes the form of an operational amplifier 32 having a non-inverting input 32a, an inverting input 32b and an output 32c. Amplifier input 32b is connected to junction 30 through an input resistor 33 to sense the magnitude of the rectified input polyphase voltage. Amplifier input 32a is connected to a source of low limit reference voltage which here takes the form of a potentiometer 34 having its ends connected between a +12 volt supply and ground and having its tap connected to input 32a through an input resistor 35.

In the present embodiment, the low limit reference voltage $V_L$ is set at a value such that the peak value of the rectified polyphase voltage is equal thereto when the input voltage has its lowest acceptable value. This relationship assures that the rectified polyphase voltage will rise above the low limit reference voltage only when the magnitude of the input voltage exceeds an acceptable minimum value. Thus, if the rectified polyphase voltage at amplifier input 32b becomes greater than the low limit reference voltage at amplifier input 32a during each voltage pulse at junction 30, it is known that each phase of the input voltage has a magnitude at least as large as its acceptable minimum.

Figure 2B:
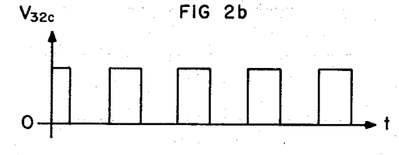

When the magnitude of the rectified polyphase voltage at amplifier input 32b is less than the low limit reference voltage $V_L$ which potentiometer 34 applies to amplifier input 32a, no current flows through amplifier output 32c. Under this condition, amplifier output 32c is raised to the potential of the +12 volt supply by a pull-up resistor 37. When, however, the rectified polyphase voltage at amplifier input 32b has a magnitude in excess of that low limit reference voltage, current flows through amplifier output 32c to drive that output to ground potential. It will, therefore, be seen that as the rectified polyphase voltage at junction 30 varies from below to above the low limit reference voltage and vice-versa, during the course of normal a-c input voltage variations, amplifier output 32c successively assumes high and low voltage states, as shown in FIGS. 2a and 2b. As will be described more fully presently, the alternating occurrence of these high and low voltage states is utilized as one indication of the suitability of the a-c input voltage.

To the end that the rectified polyphase voltage at junction 30 may be compared to a preset high voltage limit to determine whether the magnitude thereof is or is not in excess of that high voltage limit, there is provided high voltage comparing means which here takes the form of an operational amplifier 39 having a noninverting input 39a, an inverting input 39b and an output 39c. Amplifier input 39b is connected to junction 30 through an input resistor 40 to sense the magnitude of the rectified polyphase input voltage. Amplifier input 39a is connected to a source of high limit reference voltage which here takes the form of a potentiometer 41 having its ends connected between a +12 volt supply and ground and having its tap connected to input 39a through an input resistor 42.

In the present embodiment, the high limit reference voltage $V_H$ is set at a value such that the peak value of the rectified polyphase voltage at junction 30 becomes equal thereto as the peak value of the input voltage becomes equal to its highest acceptable value. This relationship assures that the rectified polyphase voltage will not rise above the high limit reference voltage unless the input voltage exceeds its acceptable maximum value. Thus, if the rectified polyphase voltage at amplifier input 39b remains less than the high limit reference voltage at amplifier input 39a during each voltage pulse at junction 30, it is known that each phase of the input voltage has a magnitude less than its acceptable maximum.

Figure 2C:
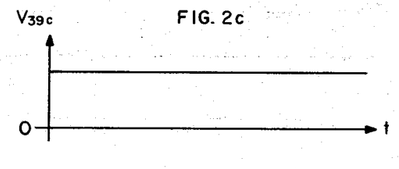
Figure 3A:
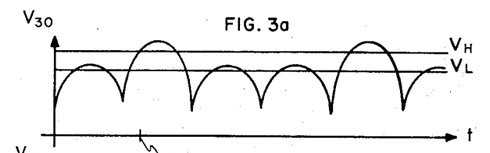
FIGS. 3a, 3b, 3c, 3d, 3e and 3f show selected ones of the voltages appearing in the circuit of FIG. 1 when the magnitude of the a-c input voltage has an unacceptably high value.
Figure 3B:
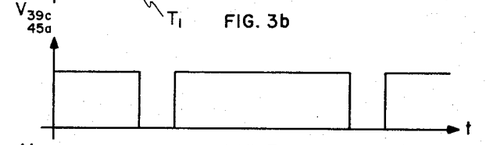

When the rectified polyphase voltage at junction 30 is less than the high limit reference voltage $V_H$ which potentiometer 41 applies to amplifier input 39a, no current flows through amplifier output 39c. Under these conditions, amplifier output 39c is raised to the potential of the +12 volt supply by pull-up resistor 43. When, however, the rectified polyphase voltage at junction 30 assumes a value in excess of the high limit reference voltage at amplifier input 39a current flows through amplifier output 39c to drive that output to ground potential. It will, therefore, be seen that when the polyphase input voltage is not excessively high, amplifier output 39c will remain continuously in its high voltage state, as shown in FIGS. 2a and 2c, and that when the polyphase input voltage has an excessively high value, amplifier output 39c will assume its low voltage state during at least the high amplitude portion of each rectified input voltage pulse which has an excessive peak magnitude, as shown in FIGS. 3a and 3b.

In accordance with one feature of the present invention, circuit output 12 remains continuously high when the voltage states at amplifier outputs 32c and 39c indicate that the peak value of the rectified polyphase voltage at junction 30 is between the low limit reference voltage $V_L$ set by potentiometer 34 and the high limit reference voltage $V_H$ set by potentiometer 41. In addition, circuit output 12 assumes its low state when the voltage at amplifier outputs 32c and 39c indicate that the peak value of one or more of the phases of the rectified polyphase voltage at junction 30 is not between low limit reference voltage $V_L$ and high limit reference $V_H$ and that this condition has occurred too frequently and has continued for too long a time.

The fault condition criteria that the voltage states at amplifier outputs 32c and 39c must indicate excessive input voltage excursions that are both too frequent and too long continued allow the circuitry of FIG. 1 to withhold a fault indication in the presence of occasional or irregularly occurring excessive excursions in one or more phases of the input voltage. This is desirable because such irregularly occurring excessive voltage excursions are commonplace and do not necessarily indicate the failure of the input voltage. The above fault condition critiera also allow the circuit of FIG. 1 to withhold a fault indication in the presence of ordinarily occurring excessive input voltage excursions such as those which occur periodically for a time during the course of transient changes in the level of the voltage being monitored. This is desirable because such transient changes in the polyphase input voltage often occur as a result of sudden changes in the level of polyphase load current and do not necessarily indicate the failure of the input voltage.

To the end that the state of circuit output 12 may be controlled in accordance with the above described fault condition criteria, there is provided a timing or control means 45 having an input 45a and an output 45b. In the present embodiment, timing means 45 includes a first timing network comprising a Schmitt trigger 47 having an input 47a and output 47b and a first resistor-capacitor network including resistor 43 and a capacitor 49. Timing means 45 also includes a second timing network comprising a Schmitt trigger 48 having an input 48a and an output 48b and a second resistor-capacitor network including a resistor 50 and a capacitor 51.

Each Schmitt trigger network is arranged to establish a low state voltage at the output thereof when the voltage at the input thereof rises above a first or positive-going input threshold value $V_{T1}$ and is adapted to establish a high state voltage at the output thereof when the voltage at the input thereof falls below a second or negative-going input threshold value $V_{T2}$. Such separate positive and negative-going thresholds serve to prevent circuit instability when the voltage applied to the Schmitt trigger inputs is variable and has a value at or near the positive-going threshold and do not otherwise appreciably affect the desired switching activity. Because the internal circuitry of Schmitt trigger networks 47 and 48 is well known to those skilled in the art, such networks are shown herein in block form only. It will be understood that first timing networks 43-47-49 and second timing network 48-50-51 are each the electrical equivalent of a retriggerable switching device such as a retriggerable monostable multivibrator.

Figure 3C:
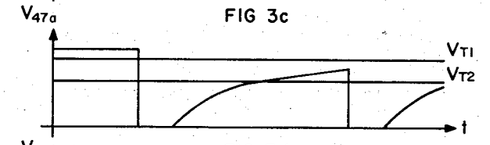
Figure 3D:
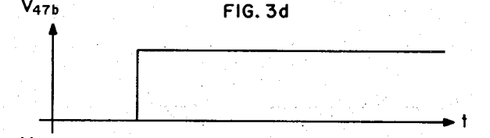
Figure 3E:
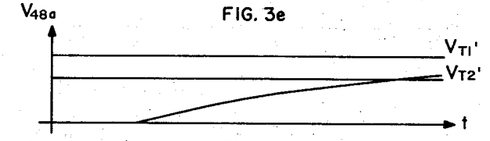
Figure 3F:
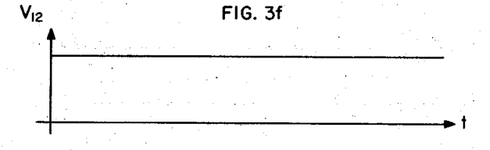

When the rectified polyphase input voltage does not have an excessive amplitude, that is, when the voltage at junction 30 remains less than high limit reference voltage $V_H$, amplifier output 39c is in its high state and applies a continuous high to timing network input 45a, as shown in FIG. 3b before time $T_1$. Under these conditions, capacitor 49 is charged to a positive d-c voltage by a charging current flowing from the +12 volt supply through resistor 43 to ground to apply to Schmitt trigger input 47a a voltage in excess of the first input voltage threshold $V_{T1}$ thereof, as shown in FIG. 3c. As a result, output 47b of Schmitt trigger 47 is in its low voltage state, as shown in FIG. 3d. The low state voltage at Schmitt trigger output 47b, in turn, causes diode 52 to conduct current from the +12 volt supply through resistor 50 to maintain capacitor 51 in a substantially uncharged condition and thereby apply to Schmitt trigger input 48a a voltage less than the input threshold voltage $V_{T1}'$, thereof, as shown in FIG. 3e. Accordingly, a high state voltage appears at Schmitt trigger output 48b and ultimately at timing network output 45b and circuit output 12, as shown in FIG. 3f. This continuously high output condition indicates that all of the phases of the polyphase input voltage have an acceptably low peak value.

If, under these conditions, any phase of the polyphase input voltage should attain and continue to attain an excessive peak value, as shown in FIG. 3a after time $T_1$, amplifier input 39b will be rendered positive from amplifier input 39a during the course of every third pulse of the rectified polyphase voltage at junction 30. As a result, amplifier output 39c will assume its low state voltage during some portion of each third pulse of the rectified polyphase voltage at junction 30, as shown in FIG. 3b. Upon the appearance of each such low state voltage at amplifier output 39c, capacitor 49 will discharge through amplifier output 39c to ground to lower the voltage at input 47a below both of its input voltage thresholds $V_{T1}$ and $V_{T2}$ and thereby force Schmitt trigger output 47b to assume its high voltage state, as shown in FIG. 3d.

In the present embodiment, the time constant of the resistor-capacitor network comprising resistor 43 and capacitor 49 is such that when an excessive input voltage causes amplifier output 39c to assume its low state as infrequently as every third pulse of the rectified polyphase input voltage, capacitor 49 is unable to charge to a voltage sufficiently high (in excess of threshold voltage $V_{T1}$) to drive Schmitt trigger output 47b back to its normally low state between low state pulses at amplifier output 39c, as shown in FIGS. 3a and 3c. Thus, as shown in FIG. 3d, Schmitt trigger output 47b remains in a continuously high condition when and for so long as at least one phase of the polyphase input voltage periodically attains an excessively high peak value.

As Schmitt trigger output 47b assumes its high state to indicate that one or more of the polyphase input voltages are assuming excessively high values on a periodic basis, diode 52 becomes non-conducting and thereby allows capacitor 51 to begin charging from the +12 volt supply through resistor 50, as shown in FIG. 3e. If this high state voltage should continue to appear at Schmitt trigger output 47b for a predetermined time, that is, for a time long enough for capacitor 51 to charge to a voltage in excess of the first input voltage threshold $V_{T1}'$ at Schmitt trigger network input 48a, trigger network output 48b will assume its low state voltage and thereby apply a low state voltage to timing network output 45c and circuit output 12. The appearance of such low state voltage at circuit output 12 indicates the existence of an input voltage fault condition.

In view of the foregoing, it will be seen that only if excessively high excursions of the input voltage occur sufficiently periodically to maintain Schmitt trigger input 47a below input threshold value $V_{T1}$ and only if such excessive input voltage excursions continue long enough to raise the potential of Schmitt trigger input 48a above input threshold value $V_{T1}'$ will circuit output 12 assume its low state voltage to indicate a polyphase voltage fault condition. Conversely, if the excessive voltage excursions of any one or more phases of the polyphase input voltage are not sufficiently periodic to maintain Schmitt trigger network output 47b in a continuously high state, or if such periodic voltage excursions do not continue for a time sufficiently long to allow the potential of Schmitt trigger network input 48a to rise above input voltage threshold $V_{T1}'$ thereof, circuit output 12 will remain in its normally high state to indicate the absence of a polyphase input voltage fault. In accordance with one feature of the present invention, the time constants associated with Schmitt trigger networks 47 and 48 are set at values such that occasional fluctuations in one or more phases of the polyphase input voltage and ordinarily occurring transient variations in the peak amplitude thereof do not cause an input voltage fault indication to appear at circuit output 12. Thus, actual voltage fault conditions are distinguished from apparent voltage fault conditions.

As previously described, when the rectified polyphase input voltage at junction 30 has an acceptably high peak value, it applies to amplifier input 32b a signal voltage which becomes greater than the low voltage reference $V_L$ applied to amplifier input 32a during a part of each pulse at junction 30. Also, as previously described, this causes amplifier output 32c to attain alternately high and low state voltages during the course of each pulse of the rectified polyphase input voltage at junction 30, as shown in FIG. 2b. In the circuit of FIG. 1, the condition in which the polyphase input voltage has an acceptably high peak value is distinguished from a condition in which that voltage does not have an acceptably high peak value on the basis of the presence or absence of low state voltage pulses at amplifier output 32c.

Figure 4A:
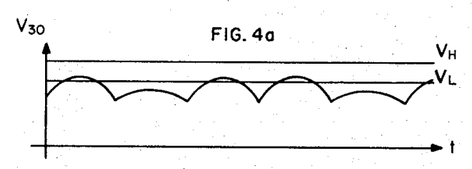
FIGS. 4a, 4b, 4c and 4d show selected ones of the voltages appearing in the circuit of FIG. 1 when the magnitude of the a-c input voltage has an unacceptably low value.
Figure 4B:
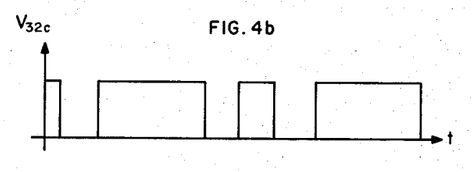

If, for example, amplifier output 32c assumes its low state during at least a portion of each pulse of the voltage at junction 30, it is known that the peak amplitude of each pulse exceeds the low voltage limit applied to amplifier 32. If, on the other hand, amplifier output 32c remains in its high state for a time longer than the maximum duration of one full pulse of the rectified polyphase input voltage, as shown in FIG. 4b, it is known that the peak amplitude of that pulse was less than the low voltage limit applied to amplifier 32. Thus, periodically occurring low state voltage pulses at amplifier output 32c, as shown in FIG. 2b, indicate a normal input voltage condition and the absence of one or more of such low state voltage pulses, as shown in FIG. 4b, indicates that one or more phases of the polyphase input voltage has an insufficient peak amplitude.

To the end that timing network input 45a may be maintained at its high state voltage so long as periodically occurring low state voltage pulses at amplifier output 32c, and may apply a low state voltage to timing network input 45a each time that one of the periodically occurring low state voltage pulses at amplifier output 32c is missing, there is provided two-state switching means having an input 54a connected to amplifier output 32c and having an output 54b connected to timing network input 45a. Thus, switching network 54 serves as a translating network disposed between amplifier output 32c and timing network input 45a to convert the input voltage information available at amplifier output 32c into input voltage information suitable for processing by timing network 45.

Figure 4C:
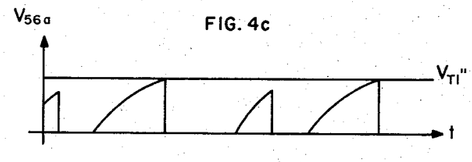

In the present embodiment, switching network 54 includes two-state switching means which here takes the form of a retriggerable monostable multivibrator 56, a resistor-capacitor timing network including a resistor 57 and a capacitor 58 and a timing network reset element which here takes the form of a PNP transistor 59. Multivibrator 56 includes a signal input 56a, a reset input 56b and an output 56c. Multivibrator 56 is adapted to maintain a high state voltage at output 56c thereof so long as the voltage at input 56a remains less than a predetermined threshold voltage $V_{T1}''$, shown in FIG. 4c, and to establish a low state voltage at output 56c when the voltage at input 56a rises to that threshold voltage. Multivibrator 56 is also adapted to establish a high state voltage at output 56c after a low state voltage appears thereat and upon the occurrence of a negative-going transition in the voltage at reset input 56b. Because multivibrator 56 is of a type which is available commercially in integrated circuit form, it is shown herein in block form only.

In the present embodiment, multivibrator input 56a is connected to the junction of resistor 57 and capacitor 58 which are, in turn, connected in series between the +12 volt supply and ground. As a result, capacitor 58 will charge and thereby cause the potential of input 56a to approach the input voltage threshold $V_{T1}''$ of multivibrator 56a at a rate determined by the resistance of resistor 57 and the capacitance of capacitor 58. Transistor 59 is, however, arranged to discharge capacitor 58 and thereby prevent the voltage thereacross from equaling the voltage threshold $V_{T1}''$ so long as amplifier 32 establishes a low state voltage at switching network input 54a during each pulse of the rectified polyphase voltage at junction 30. Transistor 59 is also arranged to allow capacitor 58 to charge to a voltage equal to voltage threshold $V_{T1}''$ if the low state voltage pulses at amplifier output 32c and switching network input 54a occur sufficiently far apart to indicate that a low state voltage pulse has not occurred during a full pulsation of the voltage at junction 30. Thus, capacitor 58 will charge to a voltage sufficient to drive multivibrator output 56c low unless that capacitor is discharged through transistor 59 as a result of periodically occurring low state voltage pulses at amplifier output 32c.

To the end that transistor 59 may be controlled in the manner described above, the emitter-base circuit thereof is connected between the +12 volt supply and amplifier output 32c through resistor 57 and the emitter-collector circuit thereof is connected across capacitor 58. These connections assure that as amplifier output 32c assumes its low state voltage, there flows from the +12 volt supply through resistor 57, the emitter-base path of transistor 59 and amplifier output 32c to ground a current which is sufficient to cause transistor 59 to conduct through its collector-emitter circuit and thereby discharge capacitor 58. Thus, capacitor 58 is discharged when and during the time that a low state voltage pulse appears at amplifier output 32c.

Figure 4D:
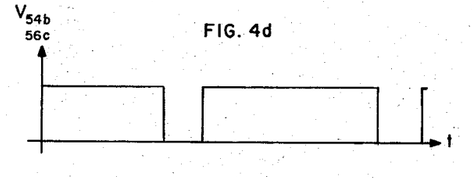

Amplifier output 32c is also connected to multivibrator reset input 56b through a conductor 62. The latter connection assures that multivibrator output 56c is reset to its high state voltage upon the first negative-going transition at amplifier output 32c that follows the establishment of a low state voltage at output 56c, as shown in FIGS. 4b and 4d. The resetting of multivibrator 56, in turn, assures that further low state voltage transitions can occur at multivibrator output 56c upon the occurrence of further missing pulses at amplifier output 32c. Thus, a low state voltage pulse appears at multivibrator output 56c and switching network output 54b each time that an ordinarily occurring low state voltage pulse fails to occur at amplifier output 32c.

In view of the foregoing, it will be seen that switching network output 54b remains high to indicate a normal input voltage condition so long as the voltage at junction 30 rises above low voltage limit $V_L$ during the course of each pulsation of the rectified input voltage, and establishes a low state voltage pulse at switching network output 54b to indicate an abnormal input voltage condition each time that the voltage at junction 30 fails to rise above low voltage limit $V_L$ during the course of each pulsation of the rectified input voltage. Thus, the low voltage fault detecting circuitry including amplifier 32 and switching network 54 applies the same kind of out-of-limits indication to timing network inputs 45a in the presence of an excessive low input voltage excursion as does the high voltage fault detecting circuitry including amplifier 39 in the presence of an excessive high input voltage excursion.

To the end that either the high voltage fault detecting circuitry including amplifier 39 or the low voltage fault detecting circuitry including amplifier 32 and switching network 54 can initiate the previously described timing activity in timing network 45, amplifier output 39c and switching network output 54b are both connected to timing network input 45a. This common connection establishes an "OR" type relationship between the high and low voltage fault detectors and thus allows either fault detector to control the state of circuit output 12. Accordingly, either excessive high or excessive low voltage excursions produce a low state voltage at circuit output 12 so long as those excessive input voltage excursions cause low state voltage pulses to be applied to timing network input 45a on a periodic basis for a long enough time. Thus, the high voltage fault detecting circuitry and the low voltage fault detecting circuitry together comprise a voltage limit comparing circuit which establishes a high state voltage at timing network input 45a when the peak amplitude of each pulsation of the pulsating d-c voltage at junction 30 is between the high and low limit reference voltages $V_H$ and $V_L$ and which establishes a low voltage at input 45a for a limited time each time that the peak amplitude of the voltage at junction 30 does not fall between those high and low limit reference voltages.

In connecting multivibrator output 56c to switching network output 54b and timing network input 45a to establish the above described "OR" relationship, a diode 60 is connected in series in the connecting path. This diode assures that the time constant of the resistor-capacitor timing network 43-49 is not affected by the relatively low output impedance of multivibrator 56 when the latter output is in its high voltage state. Diode 52 serves a similar function in connection with the time constant of resistor-capacitor timing network 50-51.

It will be understood that the circuit of the invention will produce the desired fault indication even if the out-of-limits excursions of the input voltage do not occur on a strictly periodic basis so long as such excursions occur on a recurrent basis and are sufficiently close together to prevent Schmitt trigger 47 from returning to its normally low state therebetween. Accordingly, the time constants of the circuit of FIG. 1 may be set so that a variety of types of excessive input voltage excursions will produce the desired fault indication as, for example, excessive input voltage excursions in turn in phases a, b and c of the input voltage. Similarly, the time constants of the circuit of FIG. 1 may be set so that the desired fault indication will be produced in the presence of excessive recurrent voltage excursions in a fullwave rectified single phase input voltage. Thus, any of a variety of types of recurrent out-of-limits voltage excursions will meet the periodicity requirement of timing network 45.

In view of the foregoing, it will be seen that the circuit of the invention is adapted to indicate the occurrence of an a-c voltage fault when the peak amplitude of the a-c input voltage exceeds a predetermined high limit reference value on a periodic basis for more than a predetermined time. It will also be seen that the circuit of the invention is adapted to produce a fault indication when the peak value of the polyphase input voltage fails to rise above a preset low limit reference value on a periodic basis for more than that predetermined time. Thus, the circuit of the invention is adapted to indicate the occurrence of an input voltage fault under conditions of excessive input voltage as well as under conditions of insufficient input voltage and, conversely, is adapted to withhold a fault indication in the presence of non-recurrent excessive excursions of the input voltage and in the presence of normally occurring a-c voltage transients.

It will be understood that the embodiment shown herein is for illustrative purposes only and may be changed or modified without departing from the spirit and scope of the appended claims.

What is claimed is:

1. In a circuit for indicating whether the magnitude of an a-c voltage is within acceptable voltage limits, in combination, circuit input means, circuit output means, rectifying means for establishing a pulsating d-c voltage that varies in accordance with an a-c voltage at said circuit input means, voltage limit comparing means having input means and output means, said voltage limit comparing means serving as means for establishing a first voltage at the output means thereof when the peak amplitude of each pulsation of said pulsating d-c voltage is between a predetermined high limit reference voltage and a predetermined low limit reference voltage and for establishing a second voltage at the output means thereof each time that the peak amplitude of any pulsation of said pulsating d-c voltage does not fall between said predetermined high limit reference voltage and said predetermined low limit reference voltage, timing means having an input and an output, said timing means serving as means for establishing at said circuit output means a voltage indicative of an unacceptable input voltage condition when said voltage limit comparing means applies said second voltage to the input of said timing means on at least a periodic basis for more than a predetermined time and for establishing a voltage indicative of an acceptable input voltage condition when said voltage limit comparing means does not apply said second voltage to the input of said timing means on a periodic basis for said predetermined time.

2. A circuit as set forth in claim 1 wherein the peak value of said pulsating d-c voltage becomes equal to said predetermined high limit reference voltage when the peak value of the a-c voltage at said circuit input means attains its maximum acceptable value and wherein the peak value of said pulsating d-c voltage becomes equal to said low limit reference voltage when the peak amplitude of the a-c voltage at said circuit input means attains its lowest acceptable value.

3. A circuit as set forth in claim 1 wherein said predetermined time exceeds the duration of normally occurring transient fluctuations in the peak amplitude of the a-c voltage at said circuit input means.

4. A circuit as set forth in claim 1 wherein said circuit input means comprises polyphase a-c input means adapted to be energized by a polyphase voltage.

5. A circuit as set forth in claim 4 in which said voltage limit comparing means applies said second voltage to the input of said timing means on a periodic basis when the time between the times at which said voltage limit comparing means applies said second voltage to the input of said timing means is not substantially longer than one complete cycle of the polyphase input voltage.

6. A circuit as set forth in claim 1 wherein said timing means includes a first two-state timing network having an input and an output, said first timing network being adapted to establish one voltage at the output thereof when said second voltage is applied to the input thereof on a periodic basis and for establishing another voltage at the output thereof when said second voltage is not applied to the input thereof on a periodic basis, a second two-state timing network having an input and an output, said second timing network being adapted to establish at the output thereof said voltage indicative of an acceptable input voltage condition when said first timing network applies said another voltage to the input thereof and for establishing at the output thereof said voltage indicative of an unacceptable input voltage condition when said first timing network applies said one voltage to the input thereof for said predetermined time, means for connecting the input of said first timing network to the input of said timing means, and means for connecting the output of said second timing network to the output of said timing means.

7. A circuit as set forth in claim 6 wherein said first and second two-state timing networks each comprise retriggerable monostable multivibrators.

8. A circuit as set forth in claim 6 wherein said first and second two-state timing networks each include a Schmitt trigger having an input and an output, a resistor-capacitor network and means for connecting said resistor-capacitor network across a source of voltage and to the input of the respective Schmitt trigger.

9. A circuit as set forth in claim 1 wherein said voltage limit comparing means includes first two-state switching means for comparing said pulsating d-c voltage to said predetermined high limit reference voltage and second two-state switching means for comparing said pulsating d-c voltage to said predetermined low limit reference voltage.

10. In a circuit for indicating whether the magnitude of an a-c voltage is within acceptable voltage limits, in combination, circuit input means, circuit output means, rectifying means for establishing a pulsating d-c voltage that varies in accordance with an a-c voltage at said circuit input means, high voltage fault detecting means having an input and an output, said high voltage fault detecting means serving as means for establishing a first voltage at the output thereof when said pulsating d-c voltage remains less than a predetermined high limit reference voltage during each pulsation of said pulsating d-c voltage and for establishing a second voltage at the output thereof when said pulsating d-c voltage exceeds said predetermined high limit reference voltage, low voltage fault detecting means having an input and an output, said low voltage fault detecting means serving as means for establishing a first voltage at the output thereof when said pulsating d-c voltage varies from below to above a predetermined low limit reference voltage during each pulsation of said pulsating d-c voltage and for establishing a second voltage at the output thereof each time that said pulsating d-c voltage remains less than said predetermined low limit reference voltage during a complete pulsation of said pulsating d-c voltage, timing means having an input and an output, said timing means serving as means for establishing a voltage indicative of an unacceptable input voltage condition when either said high voltage fault detecting means or said low voltage fault detecting means applies said second voltage to the input of said timing means on a periodic basis for more than a predetermined time and for establishing a voltage indicative of an acceptable input voltage condition when neither said high voltage fault detecting circuitry nor said low voltage fault detecting circuitry applies said second voltage to the input of said timing means on a periodic basis for said predetermined time.

11. A circuit as set forth in claim 10 wherein said timing means includes a first two-state timing network having an input and an output, said first timing network being adapted to establish one voltage at the output thereof when said second voltage is applied to the input thereof on a periodic basis and for establishing another voltage at the output thereof when said second voltage is not applied to the input thereof on a periodic basis, a second two-state timing network having an input and an output, said second timing network being adapted to establish at the output thereof said voltage indicative of an acceptable input voltage condition when said first timing network applies said another voltage to the input thereof and for establishing at the output thereof said voltage indicative of an unacceptable input voltage condition when said first timing network applies said one voltage to the input thereof for a predetermined time, means for connecting the input of said first timing network to the input of said timing means, and means for connecting the output of said second timing network to the output of said timing means.

12. A circuit as set forth in claim 11 wherein said first and second two-state timing networks each comprise retriggerable monostable multivibrators.

13. A circuit as set forth in claim 11 wherein said first and second two-state timing networks each include a Schmitt trigger having an input and an output, a resistor-capacitor network and means for connecting said resistor-capacitor network across a source of voltage and to the input of the respective Schmitt trigger.

14. In a circuit for detecting whether an a-c voltage has a magnitude which falls within acceptable limits, in combination, circuit input means, circuit output means, rectifying means for establishing a pulsating d-c voltage that varies in accordance with an a-c voltage at said circuit input means, high voltage comparing means having an input and an output, said high voltage comparing means serving as means for establishing at the output thereof a first voltage when said pulsating d-c voltage is less than a preset high limit reference voltage and for establishing a second voltage at the output thereof when said pulsating d-c voltage exceeds said preset high limit reference voltage, low voltage comparing means having an input and an output, said low voltage comparing means serving as means for establishing a first voltage at the output thereof when said pulsating d-c voltage is less than a predetermined low limit reference voltage and for establishing a second voltage at the output thereof when said pulsating d-c voltage exceeds said preset low limit reference voltage, translating means having an input and an output, said translating means serving as means for establishing a first voltage at the output thereof when said low voltage comparing means establishes said second voltage during each pulsation of said pulsating d-c voltage and for establishing a second voltage at the output thereof for a limited time each time that said low voltage comparing means fails to establish said second voltage during each pulsation of said pulsating d-c voltage, timing means having an input and an output, said timing means serving as means for establishing at said circuit output means a voltage which indicates an unacceptable input voltage condition when said second voltage is applied to the input of said timing means on a periodic basis for more than a predetermined time and for establishing at said circuit output means a voltage which indicates an acceptable input voltage condition when said second voltage is not applied to the input of said timing means on a non-periodic basis for more than said predetermined time, and means for connecting the output of said high voltage comparing means and the output of said translating means to the input of said timing means.

15. A circuit as set forth in claim 14 wherein said timing means includes a first two-state timing network having an input and an output, said first timing network being adapted to establish one voltage at the output thereof when said second voltage is applied to the input thereof on a periodic basis and for establishing another voltage at the output thereof when said second voltage is not applied to the input thereof on a periodic basis, a second two-state timing network having an input and an output, said second timing network being adapted to establish at the output thereof said voltage indicative of an acceptable input voltage condition when said first timing network applies said another voltage to the input thereof and for establishing at the output thereof said voltage indicative of an unacceptable input voltage condition when said first timing network applies said one voltage to the input thereof for a predetermined time, means for connecting the input of said first timing network to the input of said timing means, and means for connecting the output of said second timing network to the output of said timing means.

16. In a circuit for indicating whether the magnitude of an a-c voltage is within acceptable voltage limits, in combination, circuit input means, circuit output means, a first operational amplifier having a signal input, a reference input and an output, means for applying a high limit reference voltage to the reference input of said first operational amplifier, a second operational amplifier having a signal input, a reference input and an output, means for applying a low limit reference voltage to the reference input of said second operational amplifier, rectifying means for connecting said circuit input means to the signal inputs of said first and second operational amplifiers, a first retriggerable monostable multivibrator having a trigger input and an output, said first multivibrator being adapted to establish a first preset voltage at the output thereof for a first predetermined time each time that a trigger voltage is applied to the trigger input thereof, a second retriggerable monostable multivibrator having a trigger input and an output, said second multivibrator being adapted to establish a second preset voltage at the output thereof for a second predetermined time each time that a trigger voltage is applied to the trigger input thereof, means for connecting the output of said first operational amplifier to the trigger input of said first multivibrator, means for connecting the output of said first multivibrator to the trigger input of said second multivibrator, a third retriggerable monostable multivibrator having a trigger input and an output, said third multivibrator being adapted to establish a third preset voltage at the output thereof each time that a trigger voltage is applied to the trigger input thereof, means for connecting the output of said second operational amplifier to the trigger input of said third multivibrator, means for connecting the output of said third multivibrator to the trigger input of said first multivibrator, and means for connecting the output of said second multivibrator to said second output means.

17. In a circuit for indicating whether the magnitude of an a-c voltage is within acceptable voltage limits, in combination, circuit input means, circuit output means, a first operational amplifier having a signal input, a reference input and an output, means for applying a high limit reference voltage to the reference input of said first operational amplifier, a second operational amplifier having a signal input, reference input and an output, means for applying a low limit reference voltage to the reference input of said second operational amplifier, rectifying means for connecting said circuit input means to the signal inputs of said first and second operational amplifiers, a first two-state switching network having an input and an output, said first switching network serving as means for establishing one of two voltages at the output thereof in accordance with whether the voltage at the input thereof is above or below a first preset input voltage threshold, a first resistor-capacitor network, means for connecting said first resistor-capacitor network across a source of voltage, to the output of said first operational amplifier and to the input of said first switching network, a second two-state switching network having an input and an output, said second switching network serving as means for establishing one of two voltages at the output thereof in accordance with whether the voltage at the input thereof is above or below a second preset input voltage threshold, a second resistor-capacitor network, means for connecting said second resistor-capacitor network across a source of voltage, to the output of said first switching network and to the input of said second switching network, a third two-state switching network having a signal input and an output, said third switching network being adapted to establish one of two voltages at the output thereof in accordance with whether the voltage at the input thereof is above or below a third preset input voltage threshold, a third resistor-capacitor network, means for connecting said third resistor-capacitor network across a source of voltage and to the input of said third switching network, a discharging element for discharging said third resistor-capacitor network, means for connecting the output of said second operational amplifier in energizing relationship to said discharging element, means for connecting the output of said third switching network to the input of said first switching network, and means for connecting the output of said second switching network to said circuit output means.

* * * * *

UNITED STATES PATENT OFFICE
CERTIFICATE OF CORRECTION

Patent No. 3,836,790             Dated  September 17, 1974

Inventor(s)   Dustin J. Becker

It is certified that error appears in the above-identified patent and that said Letters Patent are hereby corrected as shown below:

In the specification, Column 8, Line 12, change "pulses at" to --pulses appear at--, Column 9, Line 44, change "inputs" to --input--.

In the claims, Column 14, Line 51, change "second output means" to --circuit output means--.

Signed and sealed this 3rd day of December 1974.

(SEAL)
Attest:

McCOY M. GIBSON JR.
Attesting Officer

C. MARSHALL DANN
Commissioner of Patents